US008850746B2

(12) United States Patent
Harrison

(10) Patent No.: US 8,850,746 B2
(45) Date of Patent: Oct. 7, 2014

(54) SEAL ASSEMBLY WITH LEAK TEST COMPONENTS

(75) Inventor: Lannie D. Harrison, Dickinson, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1326 days.

(21) Appl. No.: 12/591,746

(22) Filed: Nov. 30, 2009

(65) Prior Publication Data

US 2011/0126472 A1    Jun. 2, 2011

(51) Int. Cl.
  *B65D 1/24* (2006.01)
  *G01M 3/28* (2006.01)
  *B64G 1/22* (2006.01)
  *B64G 1/12* (2006.01)

(52) U.S. Cl.
  CPC ............. *G01M 3/2869* (2013.01); *B64G 1/22* (2013.01); *B64G 1/12* (2013.01)
  USPC ........................................ 49/477.1; 220/526

(58) Field of Classification Search
  CPC .......... G01M 3/2869; B64G 1/22; B64G 1/12
  USPC ............ 220/582, 601, 378; 49/477.1; 285/96, 285/97, 100, 106; 141/277, 49
  See application file for complete search history.

(56) References Cited

U.S. PATENT DOCUMENTS 4,274,007 A * 6/1981 Baatz et al. ................. 250/506.1
4,420,970 A * 12/1983 Organi .............................. 73/46
4,888,979 A * 12/1989 Steeper .......................... 73/40.7
5,074,663 A * 12/1991 Winterton et al. ............ 356/244
5,170,659 A * 12/1992 Kemp ................................ 73/46
5,182,076 A * 1/1993 de Seroux et al. ............ 376/250
6,223,587 B1 * 5/2001 Chiocca .......................... 73/49.6
6,299,216 B1 * 10/2001 Thompson ...................... 285/93
8,007,011 B2 * 8/2011 Muzzo et al. ................. 285/212

* cited by examiner

*Primary Examiner* — Robert J Hicks
*Assistant Examiner* — Kareen Rush
(74) *Attorney, Agent, or Firm* — Oblon, Spivak, McClelland, Maier & Neustadt, L.L.P.

(57) ABSTRACT

A seal assembly is provided for maintaining a pressure difference between an exterior and an interior of an object having an access hatch and an access hatch frame. The seal assembly has a seal retainer having an interior face oriented toward the interior of the object, an exterior face oriented toward the exterior of the object, a hatch-side face oriented toward the access hatch and extending from the interior face to the exterior face, and frame-side face oriented toward the access hatch frame and extending from the interior face to the exterior face. The seal assembly also has at least one sealing member mounted on either the interior face or the exterior face of the seal retainer and a plurality of conduits formed in the seal retainer and extending from the exterior face to the interior face. The plurality of conduits include at least one supply conduit located between either the hatch-side or frame-side face and the at least one sealing member and at least one return conduit located so that the at least one sealing member is positioned between the at least one supply conduit and the at least one return conduit.

16 Claims, 6 Drawing Sheets

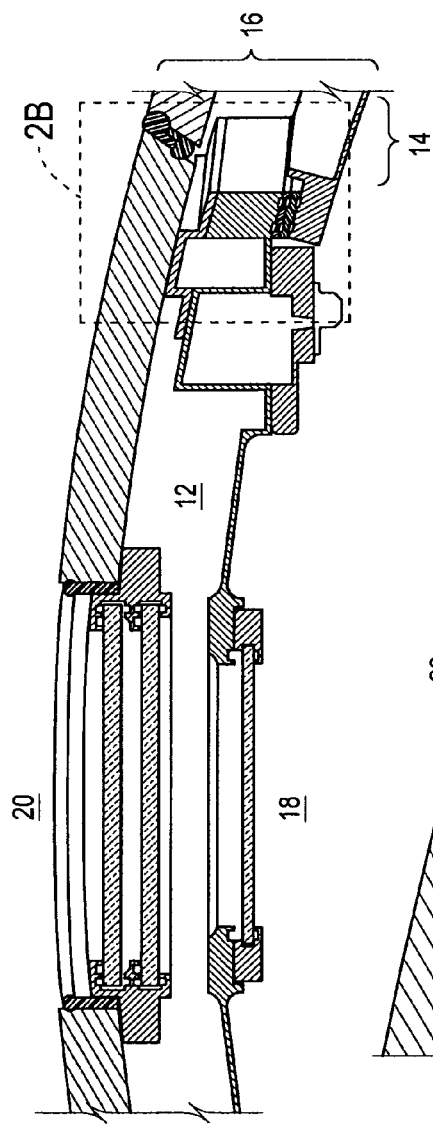
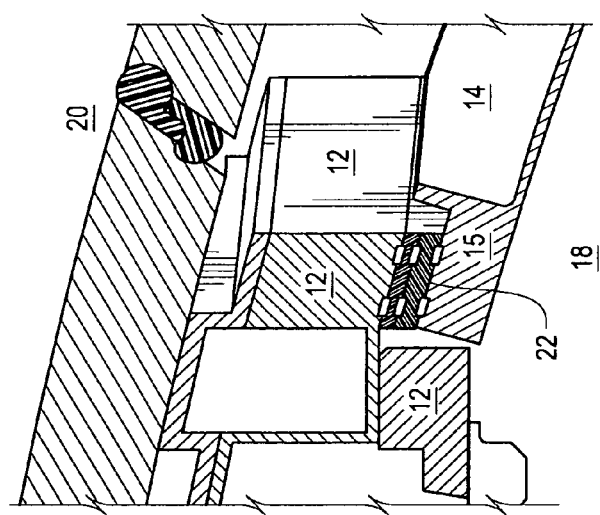
FIG. 2A
FIG. 2B

SEAL ASSEMBLY WITH LEAK TEST COMPONENTS

The U.S. government has a paid-up license in this invention and the right in limited circumstances to require the patent owner to license others on reasonable terms of U.S. Government Contract No. NNJ06TA25C awarded by the National Aeronautics and Space Administration.

BACKGROUND

Seal assemblies are used in a variety of applications where it is desired to maintain a pressure differential between an interior and an exterior of an object. The integrity of the seal assembly is critical to the maintenance of the desired pressure differential. In some applications, failure of the seal assembly can be catastrophic. Accordingly, it is desired to verify the integrity of the seal assembly.

Leak testing is one method used to verify the integrity of seal assemblies. Leak tests are performed by creating a pressure difference between two sides of a seal assembly and measuring the amount of fluid flowing from one side to the other. A common leak test employed to verify the integrity of seal assemblies is the hood test.

When performing a hood test, the object protected by the seal assembly is covered with a plastic hood (sometimes called bagging). The hood is pressurized with a fluid, such as helium gas. A detector is connected to the interior of the object, and any fluid leaking through the seal assembly is detected. Hood tests are often performed on seal assemblies mounted on vehicle access hatches such as, for example, space capsule hatches and submarine hatches.

For seal assemblies buried within the hatch, a conventional hood test can test the overall integrity of the seal assembly. However, some seal assemblies utilize redundant systems employing multiples seals. Because of a lack of accessibility for buried seal assemblies, a conventional hood test is limited to testing the overall integrity of the seal assembly and cannot test the integrity of each individual seal of the redundant seal system.

SUMMARY

In a first embodiment, a seal assembly for maintaining a pressure difference between an exterior and an interior of an object having an access hatch and an access hatch frame can include a seal retainer having an interior face oriented toward the interior of the object, an exterior face oriented toward the exterior of the object, a hatch-side face oriented toward the access hatch and extending from the interior face to the exterior face, and frame-side face oriented toward the access hatch frame and extending from the interior face to the exterior face. The seal assembly also includes at least one sealing member mounted on either the interior face or the exterior face of the seal retainer and a plurality of conduits formed in the seal retainer and extending from the exterior face to the interior face. The plurality of conduits can include at least one supply conduit located between either the hatch-side or frame-side face and the at least one sealing member and at least one return conduit located so that the at least one sealing member is positioned between the at least one supply conduit and the at least one return conduit.

In another embodiment, a seal assembly for maintaining a pressure difference between an exterior and an interior of an object having an access hatch and an access hatch frame can include a seal retainer having an interior face oriented toward the interior of the object, an exterior face oriented toward the exterior of the object, a hatch-side face oriented toward the access hatch and extending from the interior face to the exterior face, and frame-side face oriented toward the access hatch frame and extending from the interior face to the exterior face. The seal assembly can also include a first primary sealing member mounted on the exterior face of the seal retainer and a second primary sealing member mounted on the interior face of the seal retainer. The seal assembly may further include a first supplemental sealing member mounted on the seal retainer along a joint between the exterior face and either the hatch-side or frame-side face of the seal retainer and a second supplemental sealing member mounted on the seal retainer along a joint between the interior face of the seal retainer and the same hatch-side or frame-side face as the first supplemental seal member. In addition, the seal assembly can include a first sealed containment area that is formed between the first primary and first supplemental sealing members when the first primary and first supplemental sealing members are compressed and a second sealed containment area is formed between the second primary and second supplemental sealing members when the second primary and second supplemental sealing members are compressed.

In yet another embodiment, a method for testing a leak rate of a seal assembly that maintains a pressure difference between an exterior and an interior of an object, the method can include forming a plurality of sealed containment areas by compressing a plurality of sealing member sets mounted on a seal retainer, each sealing member set including a primary sealing member and at least one supplemental sealing member, wherein each sealed containment area is formed by one sealing member set. The method can also include pressurizing the plurality of sealed containment areas by supplying a fluid to the sealed containment areas via at least one supply conduit formed in the seal retainer and reducing a pressure in at least one return conduit formed in the seal retainer. The plurality of return conduits are located outside of the plurality of sealed containment areas and being fluidly connected to the primary sealing members so that any fluid from the plurality of sealed containment areas leaking through the primary seal members flows through the at least one return conduit.

BRIEF DESCRIPTION OF THE DRAWINGS

Various exemplary embodiments of this disclosure will be described in detail with reference to the following figures, wherein like numerals reference like elements, and wherein:

FIG. 2A illustrates a cross-section view of the hatch of FIG. 1;

FIG. 2B is an enlarged view of a seal assembly mounted within the hatch of FIG. 2;

DETAILED DESCRIPTION OF EMBODIMENTS

Figure 1B:
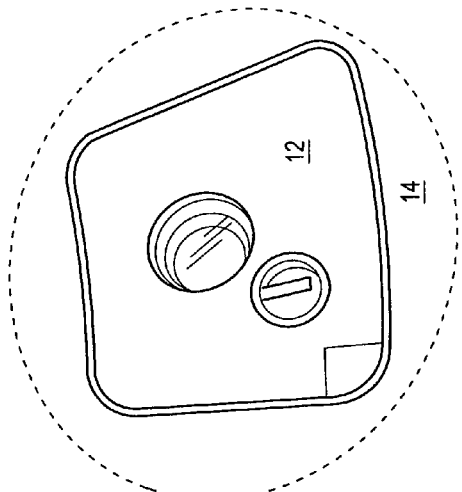
FIG. 1B illustrates an enlarged view of the spacecraft of FIG. 1A with a hatch in the closed position.
Figure 1A:
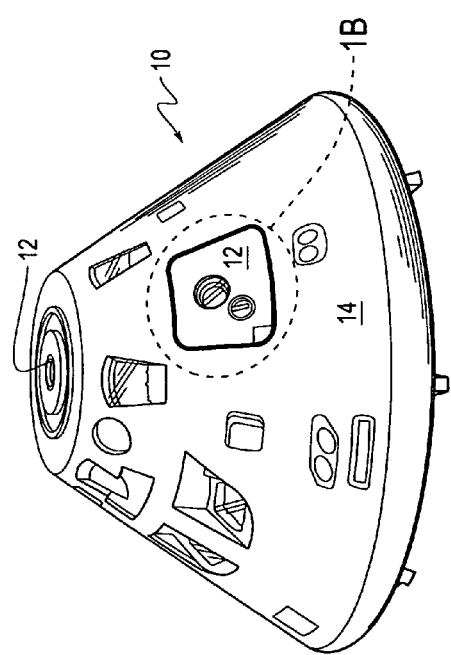
FIG. 1A illustrates an exemplary spacecraft with hatches.
Figure 1C:
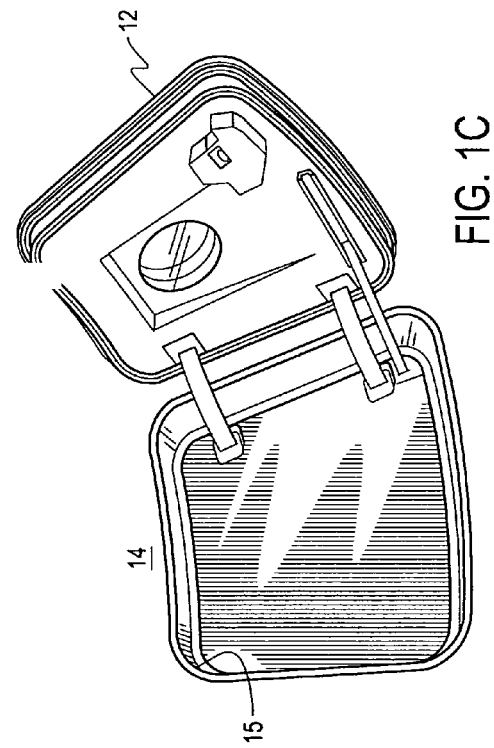
FIG. 1C illustrates an enlarged view of the spacecraft of FIG. 1A with a hatch in the open position.

FIGS. 1A and 1B show an exemplary pressurized container 10 with access hatches 12 in a closed position, while FIG. 1C shows the exemplary pressurized container 10 with the access hatch 12 in an open position. The pressurized container 10 may include an exterior shell 14 that may cooperate with the access hatch 12 to substantially isolate fluid contained within the pressurized container 10 from fluid located outside of the pressurized container 10. An access hatch frame 15 may be a part of the exterior shell 14 surrounding the access hatch 12 and may provide a surface at which the access hatch 12 may come into contact with the exterior shell 14. The access hatch 12, exterior shell 14, and access hatch frame 15 may be made from any material capable of containing a fluid at a desired pressure. Although the pressurized container 10 is illustrated as a space capsule, the pressurized container 10 may be, for example, a submarine, a pressurized aircraft, a space station, a chemical containment vessel or any other type of pressurized vessel.

FIG. 2A illustrates a cross-sectional view of the access hatch 12, exterior shell 14, and access hatch frame 15 as they interact with each other. As can be seen, when access hatch 12 is in a closed position, the access hatch 12, exterior shell 14, and access hatch frame 15 may form a containment barrier 16. The containment barrier 16 may prevent or restrict the flow of fluid between an interior 18 and an exterior 20 of the pressurized container 10. In addition, positioning the access hatch 12 in the closed position may cut-off access to the interior 18 from the exterior 20. In contrast, positioning the access hatch 12 in an open position (referring back to FIG. 1C) may permit access from the exterior 20 to the interior 18. In addition, any fluid contained within the pressurized container 10 may freely communicate with fluid located outside of the pressurized container 10.

FIG. 2B shows an enlarged view of the interaction between the access hatch 12, exterior shell 14, and access hatch frame 15. The access hatch 12 may contact the access hatch frame 15 of the exterior shell 14 through a seal assembly 22 mounted on the access hatch 12. The seal assembly 22 may be located on the access hatch 12 to seal any gap that may remain between the access hatch frame 15 and the access hatch 12 when the access hatch 12 is in the closed position.

Figure 3A:
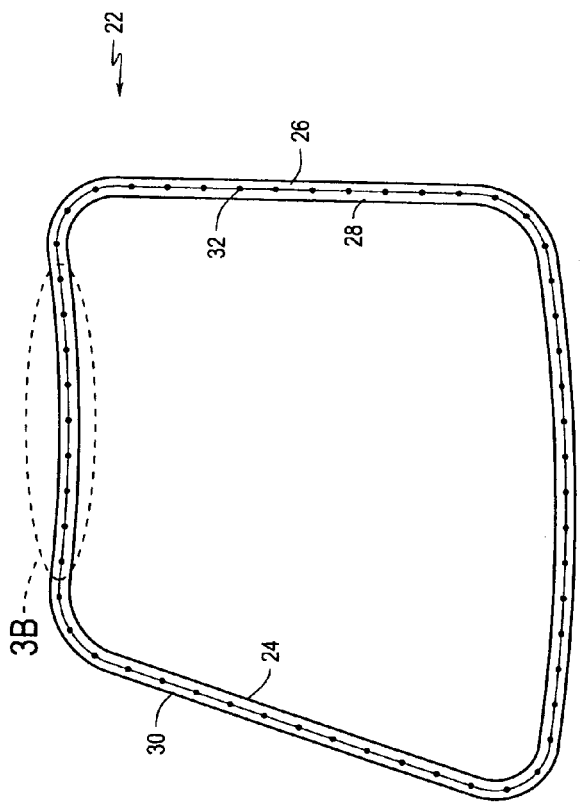
FIG. 3A illustrates a frontal view of another exemplary seal assembly.

FIG. 3A shows an exemplary seal assembly 22 as viewed from the exterior 20 of the pressurized container 10. For illustration purposes, the access hatch 12, exterior shell 14, and access hatch frame 15 are removed from view. As can be seen, the seal assembly 22 may form a loop shape mirroring the shape of the access hatch 12 so that all gaps between the access hatch frame 15 and the access hatch 12 that extend from the interior 18 to the exterior 20 may be sealed by the seal assembly 22.

The seal assembly 22 may include a seal retainer 24 that may serve as a support body onto which all of the components of the seal assembly 22 may be fixed. In addition, the seal assembly 22 may interact with the access hatch 12 via an exterior face 26 of the seal retainer 24. The exterior face 26 may be the face of the seal retainer 24 oriented toward the exterior 20 of the pressurized container 10. The seal retainer 24 may also include a hatch-side face 28 and a frame-side face 30. The hatch-side face 28 may be oriented toward the access hatch 12 along the inside of the loop shape, while the frame-side face 30 may be oriented toward the access hatch frame 15 along the outside of the loop shape. In addition, the seal retainer 24 may be made from any material rigid enough to support all of the components of the seal assembly 22. For example, the seal retainer 24 may be made from aluminum, steel, plastic or any other type of rigid material.

The seal retainer 24 may include a plurality of fastener holes 32 that may extend completely through the seal retainer 24. Each fastener hole 32 may be sized to receive a fastener (not shown) that may secure the seal assembly 22 to the access hatch 12. The fasteners used to secure seal assembly 22 to the access hatch 12 may be any type of fastening device such as, for example, bolts, screws, nails, or any other device capable of securing the seal assembly 22 to the access hatch 12.

Figure 3B:
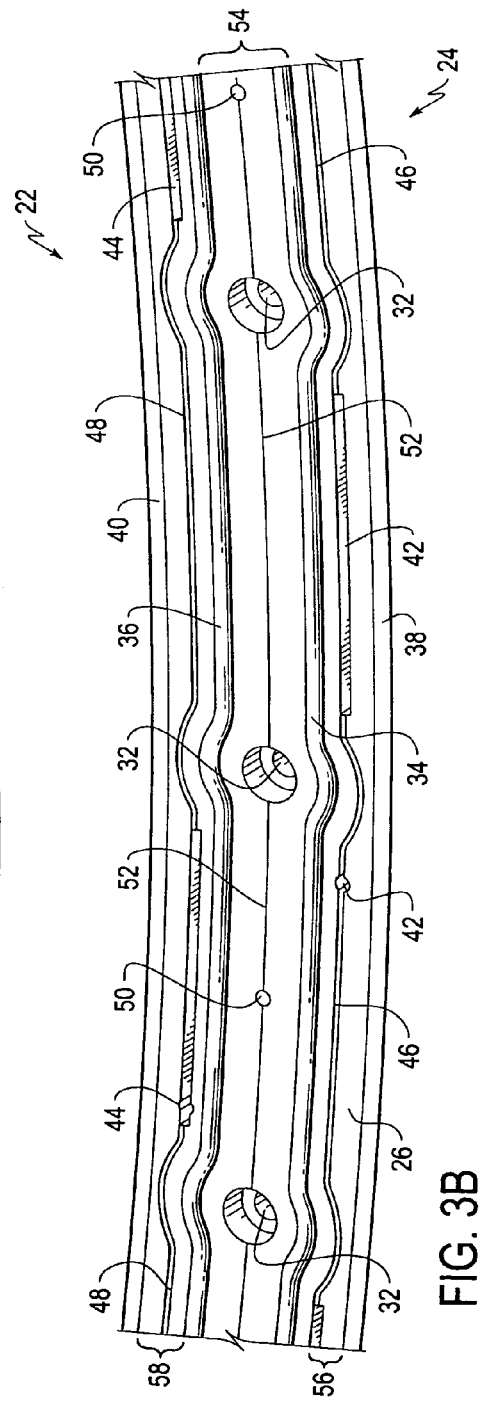
FIG. 3B illustrates an enlarged frontal view of the seal assembly of FIG. 3A.

FIG. 3B shows an enlarged view of the seal assembly 22 as viewed from the exterior 20 of the pressurized container 10. In addition to the fastener holes 32, the seal retainer 24 may include a first primary seal member 34, a second primary seal member 36, a first supplemental seal member 38, a second supplemental seal member 40, inner loop supply conduits 42, outer loop supply conduits 44, inner loop supply grooves 46, outer loop supply grooves 48, central return conduits 50, and central return grooves 52.

Due to unavoidable imperfections in the exterior face 26 and the surface of the access hatch 12 that may interact with the seal assembly 22, small gaps may form between the access hatch 12 and the seal retainer 24. These gaps may permit the flow of fluid from the exterior 20 to the interior 18 or vice versa. The first and second primary seal members 34 and 36 may be mounted on the exterior face 26 of the seal retainer 24 to prevent or restrict the flow of fluid through such gaps. In one exemplary embodiment, the first and second primary seal members 34 and 36 may be mounted so that when compressed against the access hatch 12, the first and second primary seal members 34 and 36 may form a first central containment area 54. In addition, the first and second primary seal members 34 and 36 may be substantially parallel to each other and may run along the length of the seal assembly 22. In such a configuration, the first and second primary seal members 34 and 36 may prevent or restrict the flow of fluid into or out of the first central containment area 54, thereby acting as redundant pressure seal members for preventing or restricting the flow of fluid between the interior 18 and the exterior 20 of the pressurized container 10.

The first and second primary seal members 34 and 36 may be rated for any compression volume load that may permit the first and second primary seal members 34 and 36 to maintain the interior 18 of the pressurized container 10 at a desired pressure. For example, the first and second primary seal members 34 and 36 may be rated for 70 psi. In addition, the first and second primary seal members 34 and 36 may be made from any type of flexible, impervious material such as, for example, silicon-based rubber or any other type of rubber.

The first supplemental seal member 38 may be mounted on seal retainer 24 along a joint between the hatch-side face 28 and the exterior face 26 so that when compressed against the access hatch 12, the first supplemental seal member 38 and the first primary seal member 34 may form a first inner loop containment area 56 on the exterior face 26. The first supplemental seal member 38 and the first primary seal member 34 may prevent or restrict the flow of fluid into or out of the first inner loop containment area 56. In addition, the first supplemental seal member 38 may be made from the same or similar type of material as the first primary seal member 34. For example, the first supplemental seal member 38 may be formed from such flexible, impervious materials as silicon-based rubber, or any other type of rubber.

The first supplemental seal member 38 may be rated for a compression volume load needed to retain enough fluid in the first inner loop containment area 56 for performing a leak test on the seal assembly 22. For example, the compression volume load rating of the first supplemental seal member 38 may be at least 1 psi. However, the pressure of fluid contained within the first inner loop containment area 56 may contribute to the forces acting against the compression of the first primary seal member 34. In other words, increased fluid pressures within the first inner loop containment area 56 may increase the force needed to compress the first primary seal member 34. This may compromise the performance of the first primary seal member 34 by interfering with the ability of the first primary seal member 34 to prevent or restrict the flow of fluid between the interior 18 and the exterior 20 of the pressurized container 10. Therefore, the first supplemental seal member 38 may be rated for a minimal compression volume load necessary for the performance of the leak test. This minimal rating may be much lower than the compression volume load of the first primary seal member 34 to minimize any adverse effects the first supplemental seal member 38 may have on the performance of the first primary seal member 34.

The second supplemental seal member 40 may be mounted on the seal retainer 24 along a joint between the frame-side face 30 and the exterior face 26 so that when compressed against the access hatch 12, the second supplemental seal member 40 and the second primary seal member 36 may form a first outer loop containment area 58. The second supplemental seal member 40 and the second primary seal member 36 may prevent or restrict the flow of fluid into or out of the first outer loop containment area 58. In addition, the second supplemental seal member 40 may be made from the same or similar type of material as the second primary seal member 36. For example, the second supplemental seal member 40 may be formed from such flexible, impervious materials as silicon-based rubber, or any other type of rubber Similar to the first supplemental seal member 38, the second supplemental seal member 40 may be rated for a compression volume load needed to retain enough fluid in the first outer loop containment area 58 for performing the leak test on the seal assembly 22. For example, the second supplemental seal member 40 may be at least 1 psi. To minimize any adverse effects the second supplemental seal member 40 may have on the performance of the second primary seal member 36, the second supplemental seal member 40 may be rated for a minimal compression volume load necessary for the performance of the leak test. This minimal rating may be much lower than the compression volume load of the second primary seal member 36.

The inner loop supply conduits 42 may be holes or slots in the seal retainer 24 located at strategic locations between the first primary and first supplemental seal members 34 and 38. In addition, the outer loop supply conduits 44 may be holes or slots in the seal retainer 24 located at strategic locations between the second primary and second supplemental seal members 36 and 40. The inner loop supply conduits 42 and the outer loop supply conduits 44 may permit fluid contained in the first inner loop containment area 56 and the first outer loop containment area 58 to communicate with an interior of seal retainer 24. Because the inner and outer loop supply conduits 42 and 44 may be holes or slots formed within the seal retainer 24, each inner and outer loop supply conduit 42 and 44 may adversely affect the structural integrity of the seal retainer 24. Therefore, each inner and outer loop supply conduit 42 and 44 may be sized and located to minimize any adverse effects each inner and outer loop supply conduit 42 and 44 may have on the integrity of the seal retainer 24 while still permitting fluid to freely communicate with the interior of the seal retainer 24 at pressures desired for leak testing.

The inner loop supply conduits 42 may be fluidly connected to each other via the inner loop supply grooves 46, while the outer loop supply conduits 44 may be fluidly connected to each other via the outer loop supply grooves 48. The inner loop supply grooves 46 may be grooves in the exterior face 26 of seal retainer 24 located within the first inner loop containment area 56 and running along the length of the seal assembly 22 between the inner loop supply conduits 42 so that fluid contained within the first inner loop containment area 56 may communicate with each inner loop supply conduit 42. The outer loop supply grooves 48 may be grooves in the exterior face 26 of the seal retainer 24 located within the first outer loop containment area 58 and running along the length of the seal assembly 22 between the outer loop supply conduits 44 so that fluid contained within the first outer loop containment area 58 may communicate with each outer loop supply conduit 44.

The central return conduits 50 may be holes or slots in the seal retainer 24 located at strategic locations between the first and second primary seal members 34 and 36. The central return conduits 50 may permit fluid located within the interior of the seal retainer 24 to communicate with the first central containment area 54. In addition, the central return conduits 50 may be fluidly connected to each other via the central return grooves 52. The central return grooves 52 may be grooves in the exterior face 26 of the seal retainer 24 located within the first central containment area 54 and running along the length of the seal assembly 22 between the central return conduits 50 so that fluid contained within the first central containment area 54 may communicate with each central return conduit 50.

Figure 4:
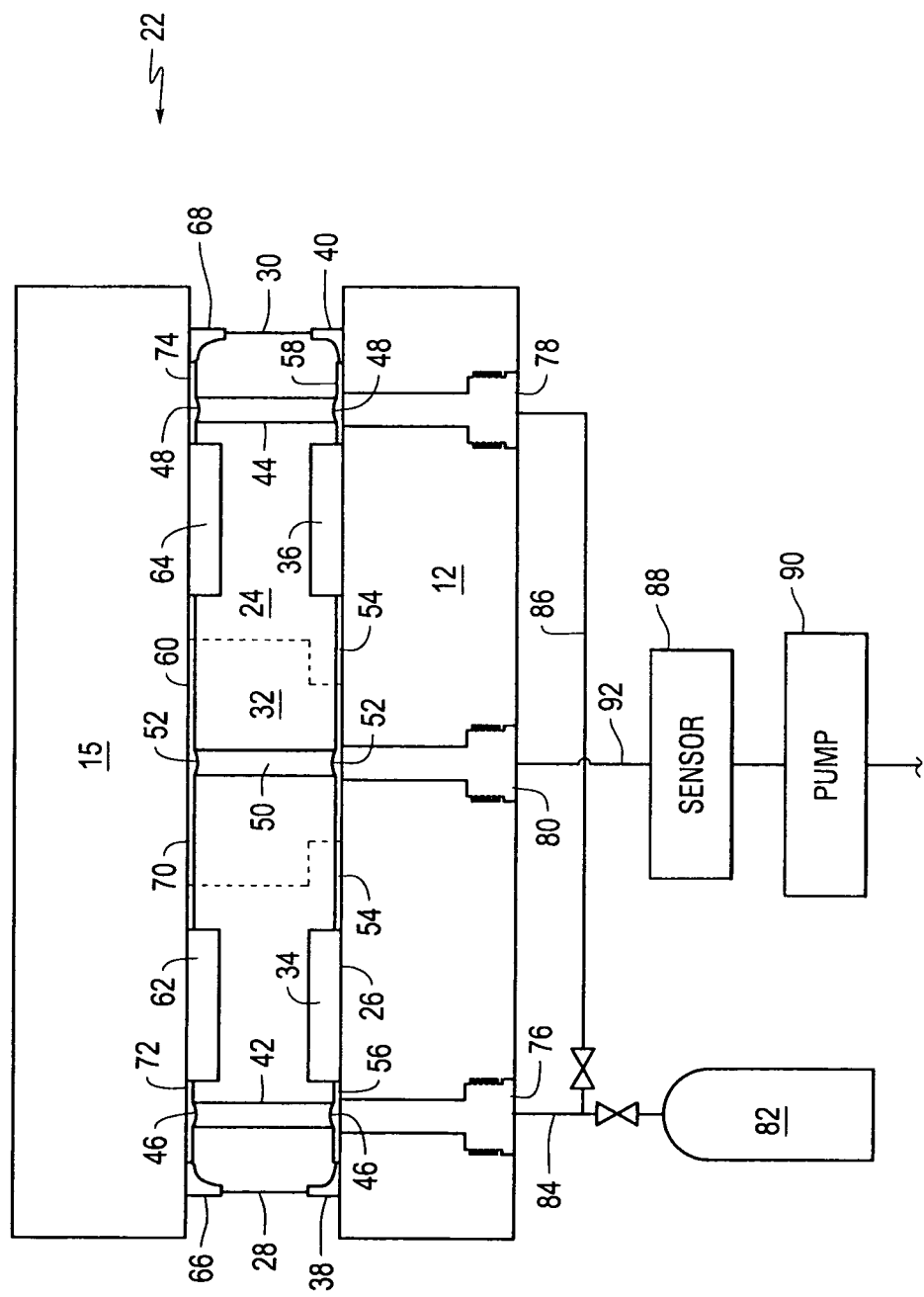
FIG. 4 illustrates a cross-sectional view of the seal assembly of FIG. 3A.

FIG. 4 shows a cross-section of the seal assembly 22 when the access hatch 12 is in a closed position. As can be seen, the seal seat retainer 24 may be permanently affixed to the access hatch 12 via fasteners inserted in fastener holes 32. In addition to the exterior face 26, the seal retainer 24 may include an interior face 60 oriented toward and situated to interact with the access hatch frame 15. Seal retainer 24 may also include a third primary seal member 62, a fourth primary seal member 64, a third supplemental seal member 66, and a fourth supplemental seal member 68 may be mounted on the interior face 60 of seal retainer 24.

Similar to the interaction between the exterior face 26 and the access hatch 12, unavoidable imperfections in the interior face 60 and the access hatch frame 15 may cause small gaps to form between the seat retainer 24 and the access hatch frame 15. These gaps may also permit the flow of fluid from the exterior 20 to the interior 18 or vice versa. The third and fourth primary seal members 62 and 64 may be mounted on the interior face 60 to prevent or restrict the flow of fluid through such gaps. In one exemplary configuration, the third and fourth primary seal members 62 and 64 may be mounted on the seal retainer 24 so that when compressed against the access hatch frame 15, the third and fourth primary seal members 62 and 64 may form a second central containment area 70. In addition, the third and fourth primary seal members 62 and 64 may run along the length of the interior face 60 just as the first and second seal members 34 and 36 may run along the length of the exterior face 26. The third and fourth primary seal members 62 and 64 may prevent or restrict the flow of fluid into or out of the second central containment area 70, thereby acting as redundant pressure seal members for preventing or restricting the flow of fluid between the interior 18 and the exterior 20 of the pressurized container 10.

Similar to the first and second primary seal members 34 and 36, the third and fourth primary seal members 62 and 64 may be rated for any compression volume load that may permit the third and fourth primary seal members 62 and 64 to maintain the interior 18 of the pressurized container 10 at a desired pressure. For example, the third and fourth primary seal members 62 and 64 may be rated for 70 psi. In addition, the third and fourth primary seal members 62 and 64 may be made from any type of flexible, impervious material such as, for example, silicon-based rubber or any other type of rubber.

The third supplemental seal member 66 may be mounted on the seal retainer 24 along a joint between the hatch-side face 28 and the interior face 60 so that when compressed against the access hatch frame 15, the third supplemental seal member 66 and third primary seal member 62 may at least partially form a second inner loop containment area 72. The third supplemental seal member 66 and third primary seal member 62 may prevent or restrict the flow of fluid into or out of the second inner loop containment area 72. In addition, the third supplemental seal member 66 may be made from the same or similar type of material as the third primary seal member 62. For example, the third supplemental seal member 66 may be formed from such flexible, impervious materials as silicon-based rubber, or any other type of rubber.

Similar to the first supplemental seal member 38, the third supplemental seal member 66 may be rated for a compression volume load needed to retain enough fluid in the second inner loop containment area 72 for performing the leak test on the seal assembly 22. For example, the third supplemental seal member 66 may be at least 1 psi. To minimize any adverse effects the third supplemental seal member 66 may have on the performance of the third primary seal member 62, the third supplemental seal member 66 may be rated for a minimal compression volume load necessary for the performance of the leak test. This minimal rating may be much lower than the compression volume load of the third primary seal member 62.

The fourth supplemental seal member 68 may be mounted on the seal retainer 24 along a joint between the frame-side face 30 and the interior face 60 so that when compressed against the access hatch frame 15, the fourth supplemental seal member 68 and fourth primary seal member 64 may at least partially form a second outer loop containment area 74. The fourth supplemental seal member 68 and fourth primary seal member 64 may prevent or restrict the flow of fluid into or out of the second outer loop containment area 74. In addition, the fourth supplemental seal member 68 may be made from the same or similar type of material as the fourth primary seal member 64. For example, the fourth supplemental seal member 68 may be formed from such flexible, impervious materials as silicon-based rubber, or any other type of rubber.

Similar to first supplemental seal member 38, fourth supplemental seal member 68 may be rated for a compression volume load needed to retain enough fluid in second outer loop containment area 74 for performing the leak test on seal assembly 22. For example, fourth supplemental seal member 68 may be at least 1 psi. To minimize any adverse effects fourth supplemental seal member 68 may have on the performance of fourth primary seal member 64, fourth supplemental seal member 68 may be rated for a minimal compression volume load necessary for the performance of the leak test. This minimal rating may be much lower than the compression volume load of fourth primary seal member 64.

As can be seen in FIG. 4, the inner loop supply conduits 42, outer loop supply conduits 44, and central return conduits 50 may all extend from the exterior face 26 to the interior face 60. In addition, the inner loop supply conduits 42 may be fluidly connected to the first and second inner loop containment areas 56 and 72 to form a continuous containment area for common fluid access to the first and third primary seal members 34 and 62. The outer loop supply conduits 44 may be fluidly connected to the first and second outer loop containment areas 58 and 74 to form a continuous containment area for common fluid access to the second and fourth primary seal members 36 and 64. Furthermore, the central return conduits 50 may be fluidly connected to the first and second central containment areas 54 and 70 to form a continuous containment area for common fluid access to the first, second, third, and fourth primary seal members 34, 36, 62, and 64.

Similar to the exterior face 26, the interior face 60 may include inner loop supply grooves 46, outer loop supply grooves 48, and central return grooves 52. In addition, the inner loop supply grooves 46, outer supply grooves 48, and central return grooves 52 located on the interior face 60 may fluidly connect the inner loop supply conduits 42, outer supply conduits 44, and central return conduits 50, respectively.

To facilitate the performance of a leak test on the seal assembly 22, the access hatch 12 may include a first supply test port 76, a second supply test port 78, and a return test port 80. The first and second supply test ports 76 and 78 may be fluidly connected to a fluid source 82 via removable fluid passages 84 and 86. In addition, the first and second supply test ports 76 and 78 may fluidly communicate with the exterior face 26 of seal retainer 24 so that fluid flowing within the first and second supply test ports 76 and 78 may fluidly communicate with the inner and outer loop supply grooves 46 and 48 located on the exterior face 26, respectively. Fluid flowing through the inner and outer loop supply grooves 46 and 48 may communicate with the inner and outer loop supply conduits 42 and 44, respectively. It is contemplated that the fluid source 82 may be any source capable of supplying a fluid to the seal assembly 22 for leak testing such as, for example, a tank. It is further contemplated that the removable fluid passages 84 and 86 may be connected to the first and second supply test ports 76 and 78 only when the leak test is being performed.

The return test port 80 may be fluidly connected to a sensor 88 and a pump 90 via a removable fluid passage 92. The return test port 80 may also fluidly communicate with the exterior face 26 of the seal retainer 24 so that fluid flowing within the central return conduits 50 and central return grooves 52 may communicate with the return test port 80. It is contemplated that the sensor 88 may be any type of sensor capable of detecting an amount of fluid flowing through the removable fluid passage 92, while the pump 90 may be any type of pump capable of maintaining a desired pressure in the central return conduits 50 and central return grooves 52. In addition, the removable fluid passage 92 may be connected to the return test port 80 only when the leak test is being performed.

Figure 5:
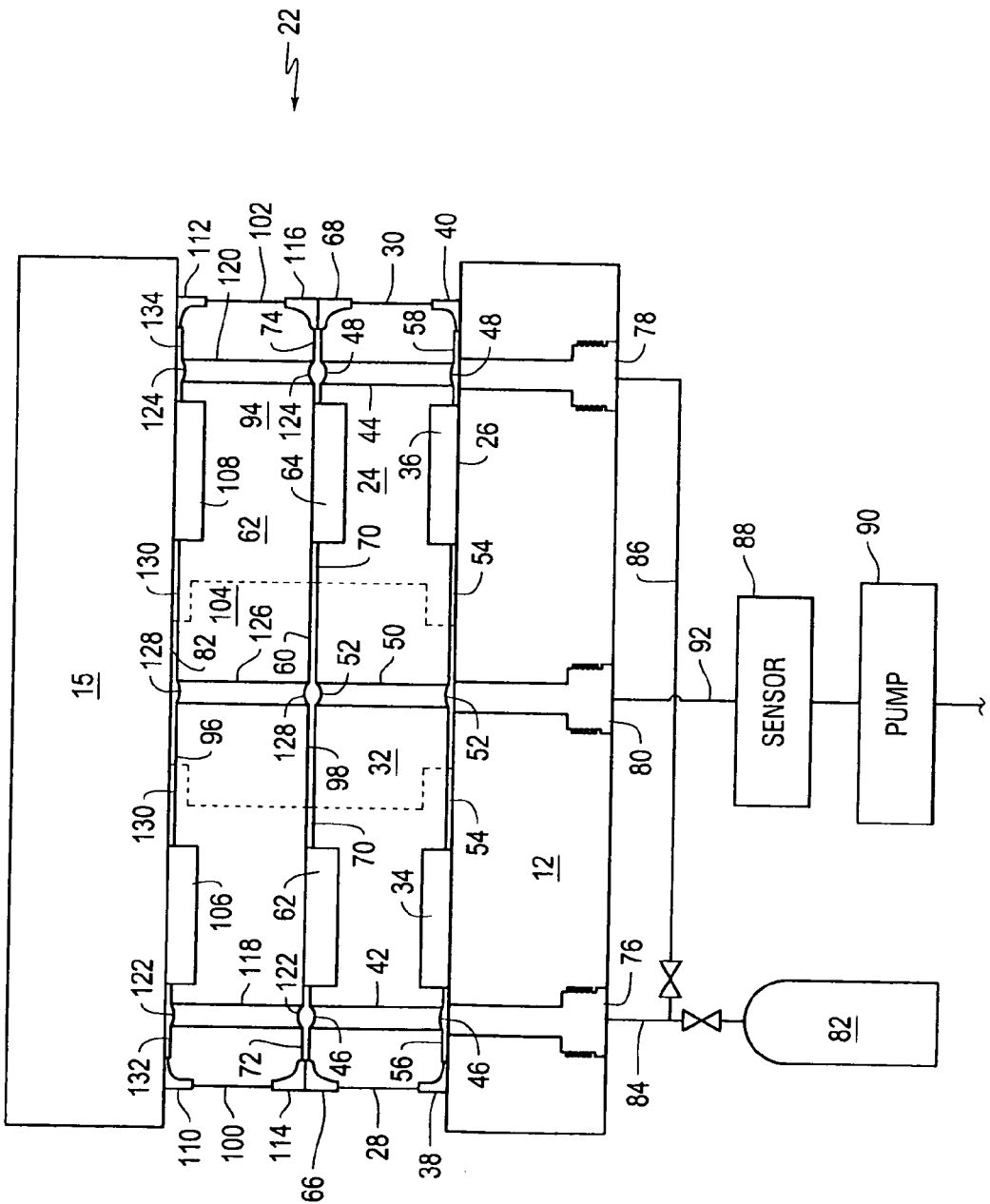
FIG. 5 illustrates a cross-sectional view of yet another exemplary seal assembly.

FIG. 5 illustrates another embodiment of the seal assembly 22 where a seal a seal seat retainer 94 may be affixed to the access hatch frame 15. The seal seat retainer 94 may provide a replaceable surface against which the third and fourth primary seals 62 and 64 may abut to form a barrier preventing or restricting the flow of fluid between the interior 18 and the exterior 20 of the pressurized container 10. The seal seat retainer 94 may include an interior face 96 oriented to the interior 18 of the pressurized container 10 and an exterior face 98 oriented toward the exterior 20 of the pressurized container 10. The seal seat retainer 94 may also include a hatch-side face 100 oriented toward the access hatch 12 along the inside of the loop shape of the seal assembly 22 and a frame-side face 102 oriented toward the access hatch frame 15 along the outside of the loop shape of the seal assembly 22. In addition, the seal seat retainer 94 may be made from any material rigid enough to form a barrier with the third and fourth primary seal members 62 and 64 that may substantially prevent or restrict the flow of fluid between the interior 18 and exterior 20 of the pressurized capsule 10. For example, the seal seat retainer 94 may be made from aluminum, steel, plastic or any other type of rigid material.

The seal seat retainer 94 may include a plurality of fastener holes 104 that may extend completely through the seal seat retainer 94. Similar to fastener holes 32, each fastener hole 104 may be sized to receive a fastener (not shown) that may secure the seal seat retainer 94 to the access hatch frame 15. The fasteners used to secure the seal seat retainer 94 to the access hatch frame 15 may be any type of fastening device such as, for example, bolts, screws, nails, or any other device capable of securing the seal seat retainer 94 the access hatch frame 15. The seal seat retainer 94 may also include a fifth primary seal member 106, a sixth primary seal member 108, a fifth supplemental seal member 110, a sixth supplemental seal member 112, a seventh supplemental seal member 114, an eighth supplemental seal member 116, inner loop supply conduits 118, outer loop supply conduits 120, inner loop supply grooves 122, outer loop supply grooves 124, central return conduits 126, and central return grooves 128.

Similar to the interaction between the exterior face 26 of the seal retainer 24 the and access hatch 12, unavoidable imperfections in the interior face 96 of the seal seat retainer 94 and the access hatch frame 15 may cause small gaps to form between the seal seat retainer 94 and the access hatch frame 15. These gaps may permit the flow of fluid from the exterior 20 to the interior 18 or vice versa. The fifth and sixth primary seal members 106 and 108 may be mounted on the interior face 96 to prevent or restrict the flow of fluid through such gaps. In one exemplary configuration, the fifth and sixth primary seal members 106 and 108 may be mounted on the interior face 96 so that when compressed against the access hatch frame 15, the fifth and sixth primary seal members 106 and 108 may form a third central containment area 130. In addition, the fifth and sixth primary seal members 106 and 108 may run along the length of the interior face 96 of the seal seat retainer just as the first and second seal members 34 and 36 may run along the length of the exterior face 26 of the seal retainer 24. The fifth and sixth primary seal members 106 and 108 may prevent or restrict the flow of fluid into or out of the third central containment area 130, thereby acting as redundant pressure seal members for preventing or restricting the flow of fluid between the interior 18 and the exterior 20 of the pressurized container 10.

Also similar to the first and second primary seal members 34 and 36, the fifth and sixth primary seal members 106 and 108 may be rated for any compression volume load that may permit the fifth and sixth primary seal members 106 and 108 to maintain the interior 18 of the pressurized container 10 at a desired pressure. For example, the fifth and sixth primary seal members 106 and 108 may be rated for 70 psi. In addition, the fifth and sixth primary seal members 106 and 108 may be made from any type of flexible, impervious material such as, for example, silicon-based rubber or any other type of rubber.

The fifth supplemental seal member 110 may be mounted on the seal seat retainer 94 along a joint between the hatch-side face 100 of the seal seat retainer 94 and the interior face 96 of the seal seat retainer 94 so that when compressed against the access hatch 15, the fifth supplemental seal member 110 and the fifth primary seal member 106 may form a third inner loop containment area 132. The fifth supplemental seal member 110 and the fifth primary seal member 106 may prevent or restrict the flow of fluid into or out of the third inner loop containment area 132. In addition, the fifth supplemental seal member 110 may be made from the same or similar type of material as the fifth primary seal member 106. For example, the fifth supplemental seal member 110 may be formed from such flexible, impervious materials as silicon-based rubber, or any other type of rubber.

Similar to the first supplemental seal member 38, the fifth supplemental seal member 110 may be rated for a compression volume load needed to retain enough fluid in the third inner loop containment area 132 for performing the leak test on the seal assembly 22. For example, the fifth supplemental seal member 110 may be at least 1 psi. To minimize any adverse effects the fifth supplemental seal member 110 may have on the performance of the fifth primary seal member 106, the fifth supplemental seal member 110 may be rated for a minimal compression volume load necessary for the performance of the leak test. This minimal rating may be much lower than the compression volume load of the fifth primary seal member 106.

The sixth supplemental seal member 112 may be mounted on the seal seat retainer 94 along a joint between the frame-side face 102 of the seal seat retainer 94 and the interior face 96 of the seal seat retainer 94 so that when compressed against the access hatch frame 15, the sixth supplemental seal member 112 and the sixth primary seal member 108 may form a third outer loop containment area 134. The sixth supplemental seal member 112 and the sixth primary seal member 108 may prevent or restrict the flow of fluid into or out of the third outer loop containment area 134. In addition, the sixth supplemental seal member 112 may be made from the same or similar type of material as the sixth primary seal member 108. For example, the sixth supplemental seal member 112 may be formed from such flexible, impervious materials as silicon-based rubber, or any other type of rubber.

Similar to the fifth supplemental seal member 110, the sixth supplemental seal member 112 may be rated for a compression volume load needed to retain enough fluid in the third outer loop containment area 134 for performing the leak test on the seal assembly 22. For example, the sixth supplemental seal member 112 may be at least 1 psi. To minimize any adverse effects the sixth supplemental seal member 112 may have on the performance of the sixth primary seal member 108, the sixth supplemental seal member 112 may be rated for a minimal compression volume load necessary for the performance of the leak test. This minimal rating may be much lower than the compression volume load of the sixth primary seal member 108.

The seventh supplemental seal member 114 may be mounted on the seal seat retainer 94 along a joint between the exterior face 98 of the seal seat retainer 94 and the hatch-side face 100 of the seal seat retainer 94 so that when compressed against the seal seat retainer 94, the third supplemental seal member 66, third primary seal member 62, and seventh supplemental seal member 114 may form the second inner loop containment area 72. The third supplemental seal member 66, third primary seal member 62, and seventh supplemental seal member 114 may prevent or restrict the flow of fluid into or out of the second inner loop containment area 72. In addition, the seventh supplemental seal member 114 may be made from the same or similar type of material as the third primary seal member 62. For example, the seventh supplemental seal member 114 may be formed from such flexible, impervious materials as silicon-based rubber, or any other type of rubber. It is contemplated that the seventh supplemental seal member 114 may be omitted if desired. In such an embodiment, the second inner loop containment area 72 may be formed by the third supplemental seal member 66 and the third primary seal member 62.

Similar to the third supplemental seal member 66, the seventh supplemental seal member 114 may be rated for a compression volume load needed to retain enough fluid in the second inner loop containment area 72 for performing the leak test on the seal assembly 22. For example, the seventh supplemental seal member 114 may be at least 1 psi. To minimize any adverse effects the seventh supplemental seal member 114 may have on the performance of the third primary seal member 62, the seventh supplemental seal member 114 may be rated for a minimal compression volume load necessary for the performance of the leak test. This minimal rating may be much lower than the compression volume load of the third primary seal member 62.

The eighth supplemental seal member 116 may be mounted on the seal seat retainer 94 along a joint between the exterior face 98 of the seal seat retainer 94 and the frame-side face 102 of the seal seat retainer 94 so that when compressed against the seal seat retainer 94, the fourth supplemental seal member 68, fourth primary seal member 64, and eighth supplemental seal member 116 may form the second outer loop containment area 74. The fourth supplemental seal member 68, fourth primary seal member 64, and eighth supplemental seal member 116 may prevent or restrict the flow of fluid into or out of the second outer loop containment area 74. In addition, the eighth supplemental seal member 116 may be made from the same or similar type of material as the fourth primary seal member 64. For example, the eighth supplemental seal member 116 may be formed from such flexible, impervious materials as silicon-based rubber, or any other type of rubber. It is contemplated that the eighth supplemental seal member 116 may be omitted if desired. In such an embodiment, the second outer loop containment area 74 may be formed by the fourth supplemental seal member 68 and the fourth primary seal member 64.

Similar to fourth supplemental seal member 68, the eighth supplemental seal member 116 may be rated for a compression volume load needed to retain enough fluid in the second outer loop containment area 74 for performing the leak test on the seal assembly 22. For example, the eighth supplemental seal member 116 may be at least 1 psi. To minimize any adverse effects the eighth supplemental seal member 116 may have on the performance of the fourth primary seal member 64, the eighth supplemental seal member 116 may be rated for a minimal compression volume load necessary for the performance of the leak test. This minimal rating may be much lower than the compression volume load of the fourth primary seal member 64.

Similar to the inner loop supply conduits 42, the inner loop supply conduits 118 may be holes or slots in the seal seat retainer 94 located at strategic locations between the fifth primary and fifth supplemental seal members 106 and 110. In addition, the outer loop supply conduits 120 may be holes or slots in the seal seat retainer 94 located at strategic locations between the sixth primary and sixth supplemental seal members 108 and 112. When the access hatch 12 is in the closed position, the inner loop supply conduits 118 may be fluidly connected to the inner loop supply conduits 42 so that fluid contained in the first and second inner loop containment areas 56 and 72 may communicate with the third inner loop containment area 132. Additionally, the outer loop supply conduits 120 may be fluidly connected to the outer loop supply conduits 44 so that fluid contained in the first and second outer loop containment areas 58 and 74 may communicate with the third outer loop containment area 134. Because the inner and outer loop supply conduits 118 and 120 may be holes or slots formed within the seal seat retainer 94, each inner and outer loop supply conduit 118 and 120 may adversely affect the structural integrity of the seal seat retainer 94. Therefore, each inner and outer loop supply conduit 118 and 120 may be sized and located to minimize any adverse effects each inner and outer loop supply conduit 118 and 120 may have on the integrity of the seal seat retainer 94 while still permitting fluid to freely communicate with the interior of the seal seat retainer 94 at pressures desired for leak testing.

The inner loop supply conduits 118 may be fluidly connected to each other via the inner loop supply grooves 122, while the outer loop supply conduits 120 may be fluidly connected to each other via the outer loop supply grooves 124. The inner loop supply grooves 122 may be grooves in the interior face 96 of the seal seat retainer 94 located within the third inner loop containment area 132 and grooves in the exterior face 98 of the seal retainer 94 located within the second inner loop containment area 72. In addition, the inner loop supply grooves 122 may run along the length of the seal assembly 22 between the inner loop supply conduits 118 so that fluid contained within the second and third inner loop containment areas 72, 132 may communicate with each inner loop supply conduit 118. The outer loop supply grooves 124 may be grooves in the interior face 96 of the seal seat retainer 94 located within the third outer loop containment area 134 and grooves in the exterior face 98 of the seal retainer 94 located within the second outer loop containment area 74. In addition, the outer loop supply grooves 124 may run along the length of the seal assembly 22 between the outer loop supply conduits 120 so that fluid contained within the second and third outer loop containment areas 74, 134 may communicate with each outer loop supply conduit 120.

The central return conduits 126 may be holes or slots in the seal seat retainer 94 located at strategic locations between the fifth and sixth primary seal members 106 and 108. When the access hatch 12 is in the closed position, the central return conduits 126 may be fluidly connected to the central return conduits 50 so that fluid contained in the second central containment areas 70 may communicate with the third central containment area 130. In addition, the central return conduits 126 may be fluidly connected to each other via the central return grooves 128. The central return grooves 128 may be grooves in the interior face 96 of the seal seat retainer 94 located within the third central containment area 130 and grooves in the exterior face 98 of the seal retainer 94 located within the second central containment area 70. Furthermore, the central return grooves 128 may run along the length of the seal assembly 22 between the central return conduits 126 so that fluid contained within the second and third central containment areas 70, 130 may communicate with each central return conduit 126.

During the performance of a leak test, a fluid may be supplied to the supply grooves 46 via the first supply test port 76. Once flowing through the supply grooves 46, the fluid may flow through the supply conduits 42 and enter the first, second, and third inner loop containment areas 56, 72, and 132. Once in the first, second, and third inner loop containment areas 56, 72, and 132, the fluid may be drawn through any defects in the first, third, and fifth primary seal members 34, 62, and 106 to the first, second, and third central containment areas 54, 70, and 130 by a pressure difference between the first, second, and third inner loop containment areas 56, 76, and 132, and the first, second, and third central containment areas 54, 70, 130 respectively. Once in the central containment areas 54, 74, and 130, the fluid may be drawn through the central return conduits 50 and 126, central return grooves 52 and 128 and ultimately out of the seal assembly 22 through the return test port 80 where the amount of fluid leaking through the primary seals 34, 62, and 106 can be measured by the sensor 88. The same test can be repeated for the outer loop side of the seal assembly 22.

Figure 6:
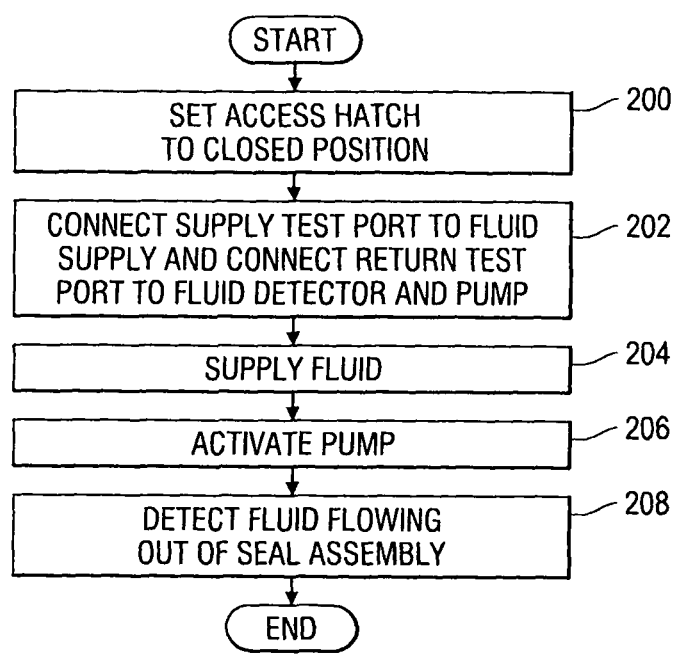
FIG. 6 is a flow chart of an exemplary method for performing a seal test.

FIG. 6 illustrates a method for performing a leak test on the seal assembly 22. For illustration purposes, a leak test performed on the first, third, and fifth primary seal members 34, 62, and 106 will be described. However, it should be understood that the same method may be used to test the second, fourth, and sixth primary seal members 36, 64, and 108. In addition, it contemplated that fluid may be supplied to either the first supply test port 76 or the second supply test port 78, but not both at the same time.

The method may begin at step 200 by setting the access hatch 12 to a closed position so that all primary and supplemental seal members mounted on the seal retainer 24 and the seal seat retainer 94 may be compressed. Next, the removable passage 84 may be connected to the first supply test port 76 so that the fluid source 82 may be fluidly connected to the first supply test port 76, while the removable passage 92 may be connected to the return test port 80 so that the return test port 80 may be fluidly connected to the sensor 88 and the pump 90 (step 202). The fluid supplied to first supply test port 76 may be any type of fluid useful for detecting leaks such as, for example, helium gas and may be at any useful pressure to perform a leak test.

Next, in step 204, fluid may be supplied to the exterior face 26 of seal retainer 24 from first supply test port 76. Once fluid is supplied to the exterior face 26 of the seal retainer 24, the fluid may flow though the inner loop supply grooves 46 located on the exterior face 26. From the inner loop supply grooves 46 located on the exterior face 26, the fluid may flow through the inner loop supply conduits 42 to the first and second inner loop containment areas 56 and 72 and hence to the first and third primary seal members 34 and 62. In addition, the fluid may flow from the inner loop supply conduits 42 in the seal retainer 24 to the inner loop supply conduits 118 in the seal seat retainer 94. From the inner loop supply conduits 118, the fluid may flow to the third inner loop containment area 132 and hence to the fifth primary seal member 106.

Once the fluid is supplied to the first, second, and third inner loop containment areas 56, 72, 132, the pump 90 may be activated to create a desired pressure differential between the first, second, and third inner loop containment areas 56, 72, 132 and the first, second, and third central containment areas 54, 70, 130, respectively (step 206). Creating the pressure differential may cause fluid inside the first, second, and third inner loop containment areas 56, 72, 132 to flow through any defects in the first, third, and fifth primary seal members 36, 62, and 106 to the first, second, and third central containment areas 54, 70, 130, respectively.

After fluid begins flowing from the first, second, and third inner loop containment areas 56, 72, 132 to the first, second, and third central containment areas 54, 70, 130, fluid may flow through the central return conduits 50, central return grooves 52, and toward the sensor 88 and the pump 90 via removable the fluid passage 92. While fluid is flowing through the removable fluid passage 92, the sensor 88 may detect an amount of fluid flowing through the removable fluid passage 92 (step 208). When a threshold amount of fluid has been detected or when an allotted period of time for performing the leak test has expired, the leak test may be terminated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A seal assembly for maintaining a pressure difference between an exterior and an interior of an object having an access hatch and an access hatch frame, the seal assembly comprising:
    a first seal retainer having an interior face oriented toward the interior of the object, an exterior face oriented toward the exterior of the object, a hatch-side face oriented toward the access hatch and extending from the interior face to the exterior face, and frameside face oriented toward the access hatch frame and extending from the interior face to the exterior face;
    at least one sealing member mounted on either the interior face or the exterior face of the first seal retainer; and
    a plurality of conduits formed in the first seal retainer and extending from the exterior face to the interior face, the first plurality of conduits including:
        at least one supply conduit located between either the hatch-side or frame-side face and the at least one sealing member; and
        at least one return conduit located so that the at least one sealing member is positioned between the at least one supply conduit and the at least one return conduit.

2. The seal assembly of claim 1, wherein the plurality of conduits further includes a first group of supply conduits, the supply conduits of the first group being fluidly connected to each other via supply grooves formed on a same face on which the at least one sealing member is mounted, the first group of supply conduits being located between either the hatch-side or frame-side face and the at least one sealing member.

3. The seal assembly of claim 2, wherein the plurality of conduits further includes a plurality of return conduits, the plurality of return conduits being fluidly connected to each other via return grooves formed on a same face as the supply grooves, the plurality of return conduits being located so that the at least one sealing member is positioned between the first group of supply conduits and the plurality of return conduits.

4. The seal assembly of claim 3, further including at least a first sealing member and a second sealing member, the first and second sealing members being mounted on the same face of the first seal retainer.

5. The seal assembly of claim 4, wherein the plurality of conduits further includes a second group of supply conduits, the supply conduits of the second group being fluidly connected to each other via supply grooves formed on a same face as the return grooves, the first group of supply conduits being located between the hatch-side face and the first sealing member, and the second group of supply conduits being located between the frame-side face and the second sealing member.

6. The seal assembly of claim 5, further including at least a third sealing member and a fourth sealing member, wherein the first and second sealing members are mounted on the exterior face of the first seal retainer and the third and fourth sealing members are mounted on the interior face of the first seal retainer, the third sealing member being located between the first group of supply conduits and the plurality of return conduits, and the fourth sealing member being located between the second group of supply conduits and the plurality of return conduits.

7. The seal assembly of claim 6, further including a second seal retainer, the second seal retainer having an interior face oriented toward the interior of the object, an exterior face oriented toward the exterior of the object, a hatch-side face oriented toward the access hatch and extending from the interior face to the exterior face, and frame-side face oriented toward the access hatch frame and extending from the interior face to the exterior face, wherein the plurality of conduits extends to the interior face of the second seal retainer when the interior face of the first seal retainer abuts the exterior face of the second seal retainer, the first group of supply conduits being connected to each other via supply grooves formed on the interior face of the second seal retainer, the second group of supply conduits being connected to each other via supply grooves formed on the interior face of the second seal retainer, and the plurality of return conduits being connected to each other by return grooves formed on the interior face of the second seal retainer.

8. The seal assembly of claim 7, further including a fifth sealing member and a sixth sealing member, wherein the fifth and sixth sealing members are mounted on the interior face of the second seal retainer, the fifth sealing member being located between the first group of supply conduits and the plurality of return conduits, and the sixth sealing member being located between the second group of supply conduits and the plurality of return conduits.

9. A seal assembly for maintaining a pressure difference between an exterior and an interior of an object having an access hatch and an access hatch frame, the seal assembly comprising:
   a first seal retainer having an interior face oriented toward the interior of the object, an exterior face oriented toward the exterior of the object, a hatch-side face oriented toward the access hatch and extending from the interior face to the exterior face, and a frame side face oriented toward the access hatch frame and extending from the interior face to the exterior face;
   a first primary sealing member mounted on the exterior face of the first seal retainer;
   a second primary sealing member mounted on the interior face of the first seal retainer;
   a first supplemental sealing member mounted on the first seal retainer along a joint between the exterior face of the first seal retainer and either the hatch-side or frame-side face of the first seal retainer; and
   a second supplemental sealing member mounted on the first seal retainer along a joint between the interior face of the first seal retainer and the hatch-side or frame-side face as the first supplemental seal member;
   a first sealed containment area that is formed between the first primary and first supplemental sealing members when the first primary and first supplemental sealing members are compressed; and
   a second sealed containment area is formed between the second primary and second supplemental sealing members when the second primary and second supplemental sealing members are compressed.

10. The seal assembly of claim 9, further including at least a first group of supply conduits formed in the first seal retainer and extending from the exterior face to the interior face, each supply conduit of the first group of supply conduits being fluidly connected to the first and second sealed containment areas.

11. The seal assembly of claim 10, further including:
   a third primary sealing member mounted on the exterior face of the first seal retainer;
   a fourth primary sealing member mounted on the interior face of the first seal retainer;
   a third supplemental sealing member mounted on the first seal retainer along the joint between the frame-side and exterior faces of the first seal retainer; and
   a fourth supplemental sealing member mounted on the first seal retainer along the joint between the frame-side and interior faces of the first seal retainer, wherein
   a third sealed containment area is formed between the third primary and third supplemental sealing members when the third primary and third supplemental sealing members are compressed, and
   a fourth sealed containment area is formed between the fourth primary and fourth supplemental sealing members when the fourth primary and fourth supplemental sealing members are compressed, wherein
   the first supplemental sealing member is mounted on the first seal retainer along the joint between the hatch-side and exterior faces of the first seal retainer, and the second supplemental sealing member is mounted on the first seal retainer along the joint between the hatch-side and interior faces of the first seal retainer.

12. The seal assembly of claim 11, further including a second group of supply conduits formed in the first seal retainer and extending from the exterior face to the interior face of the first seal retainer, each supply conduit of the second group of supply conduits being fluidly connected to the third and fourth sealed containment areas.

13. The seal assembly of claim 12, further including a second seal retainer, the
   second seal retainer having an interior face oriented toward the interior of the object, an exterior face oriented toward the exterior of the object, a hatch-side face oriented toward the access hatch and extending from the interior face to the exterior face, and frame-side face oriented toward the access hatch frame and extending from the interior face to the exterior face, wherein the first and second groups of supply conduits extend to the interior face of the second seal retainer when the interior face of the first seal retainer abuts the exterior face of the second seal retainer, the first group of supply conduits being connected to each other via supply grooves formed on the interior face of the second seal retainer and the second group of supply conduits being connected to each other via supply grooves formed on the interior face of the second seal retainer.

14. The seal assembly of claim 13, further including:
   a fifth and a sixth primary sealing member mounted on the interior face of the second seal retainer:
   a fifth supplemental sealing member mounted on the second seal retainer along the joint between the frame-side and interior faces of the second seal retainer;
   a sixth supplemental sealing member mounted on the second seal retainer along the joint between the hatch-side and interior faces of the second seal retainer;
   a seventh supplemental sealing member mounted on the second seal retainer along the joint between the frame-side and exterior faces of the second seal retainer;
   an eighth supplemental sealing member mounted on the second seal retainer along the joint between the hatch-side and the exterior faces of the second seal retainer;
   a fifth sealed containment area that is formed between the fifth primary sealing member and the fifth supplemental sealing member when the fifth primary sealing member and the fifth supplemental sealing member is compressed; and
   a sixth sealed containment area that is formed between the sixth primary sealing member and the sixth supplemental sealing member when the sixth primary sealing member and the sixth supplemental sealing member are compressed.

15. The seal assembly of claim 14, wherein the supplemental sealing members have a lower pressure volume load rating than the primary sealing members.

16. The seal assembly of claim 9, wherein the primary and supplemental sealing members are made from same material.

* * * * *